Feb. 5, 1952 — L. E. BROWN — 2,584,543
SPRINKLER HOSE HOLDER
Filed May 26, 1949
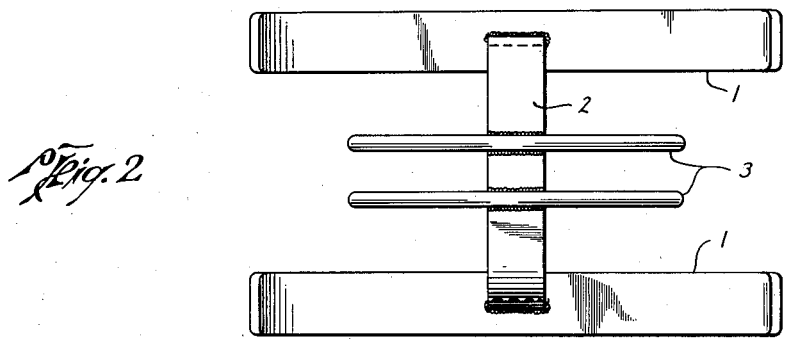
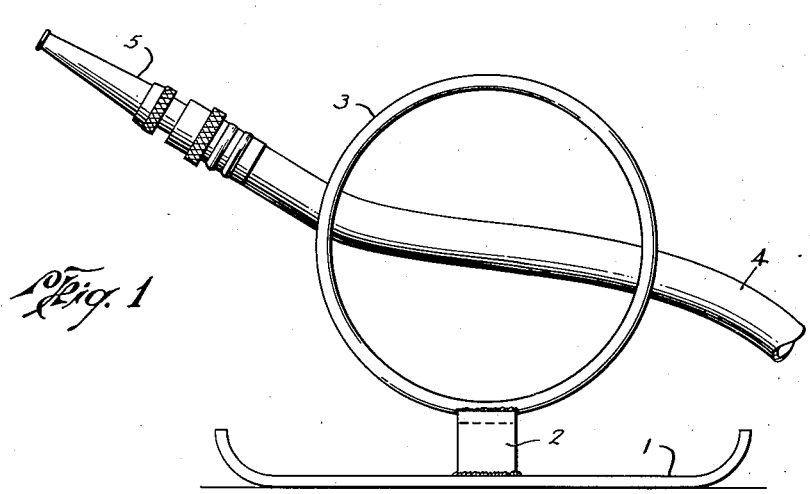
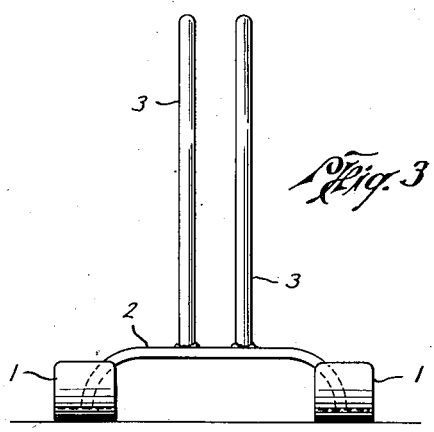
Luthur E. Brown
INVENTOR.
BY Charles E. Lightfoot
ATTORNEY Patented Feb. 5, 1952

2,584,543

UNITED STATES PATENT OFFICE 2,584,543

SPRINKLER HOSE HOLDER

Luther E. Brown, Greggton, Tex.

Application May 26, 1949, Serial No. 95,438

2 Claims. (Cl. 248—80)

This invention relates to a sprinkler hose holder.

It is an object of the present invention to provide a holder of the character described which will clamp and hold a hose adjacent the nozzle and in such manner that the nozzle may be maintained in any selected direction.

The holder is primarily designed for gripping and holding a sprinkler hose, that is a hose while it is being used for sprinkling or spraying water over lawns or other ground surfaces.

It is another object of the present invention to provide a holder which presents a wide supporting surface so that it will remain upright and which may be readily moved along the surface from place to place as desired.

A still further object of the invention is to provide a holder which will clamp the hose at spaced points along the hose so as to maintain the nozzle end of the hose and the nozzle in a selected position.

Other objects and advantages will be apparent from the following specification which is illustrated by the accompanying drawings, wherein:

Figure 1 is a side view of the holder shown clamping the hose;

Figure 2 is a plan view thereof; and

Figure 3 is an end elevation.

Referring now more particularly to the drawings, the numerals 1, 1 designate side runners which are preferably of relatively wide flat plates of metal or other suitable material, and the ends of these runners are upwardly curved so as not to interfere with movement in either direction.

These runners are spaced apart but are united by an inverted U-shaped cross-bar 2 whose ends may be welded to the top of the runners intermediate their ends.

The runners and cross-bar form a convenient type of support and carriage, although it is obvious that this specific type of carriage may be varied as to material or construction as desired.

Mounted on the cross-bar are the hose clamps 3, 3.

These clamps are spaced apart a distance which is slightly less than the transverse diameter of the hose to be held, and they are slightly flexible so that the hose may be easily inserted between them but will be held in any selected position.

In a preferred form of the invention, as shown, these clamps are in the form of metal rings which are welded to the cross-bar 2. Other suitable material and other means for securing the clamps to the cross-bar may be employed if desired.

The rings are believed to be preferable not only on account of cheapness and practicability but because they will grip the hose 4 at two points which are spaced apart so that the free end of the hose and the nozzle 5 thereon will be securely held at any selected point of adjustment so that the nozzle will be at the correct angular relation with respect to the ground surface being sprinkled.

It is obvious that the carriage may be easily moved from place to place as the sprinkling operation is carried on.

The drawings and description are by way of illustration only and not by way of limitation, as it is clear that various structural changes may be made in order to accomplish the desired result and without departing from the principle of the invention as defined by the appended claims.

What I claim is:

1. A holder of the character described comprising, spaced runners whose ends are upturned, an inverted U-shaped cross-bar whose ends are secured to the runners, annular grip members spaced apart and in approximately concentric relation directly secured to and upstanding from the cross-bar to receive and grip a hose between them.

2. A holder of the character described comprising, spaced runners whose ends are upturned, an inverted U-shaped cross-bar whose ends are secured to the runners, annular grip members spaced apart and in approximately concentric parallel relation welded directly upon and upstanding from the cross-bar to receive and grip a hose between them, said grip members being slightly flexible.

LUTHER E. BROWN.

REFERENCES CITED

The following references are of record in the file of this patent:

UNITED STATES PATENTS

| Number | Name | Date |
|---|---|---|
| 902,863 | Darrow | Nov. 3, 1908 |
| 1,821,305 | Hauenstein | Sept. 1, 1931 |
| 2,045,336 | Skoglund | June 23, 1936 |